March 2, 1954  F. D. MATRAS  2,670,560

FISHING BOBBER

Filed Oct. 2, 1950

Inventor
FRANK D. MATRAS

By
Wheeler, Wheeler & Wheeler
Attorneys

Patented Mar. 2, 1954

2,670,560

UNITED STATES PATENT OFFICE 2,670,560

FISHING BOBBER

Frank D. Matras, Milwaukee, Wis., assignor to Frabill Manufacturing Company, Milwaukee, Wis., a corporation of Wisconsin Application October 2, 1950, Serial No. 188,020

6 Claims. (Cl. 43—44.87)

This invention relates to improvements in fishing bobbers.

The principal object of the invention is to provide a fishing float or bobber which may be freely adjusted along a fish line and clamped at a selected point thereon. In this connection it is an object of the invention to provide a fishing bobber having a line engaging mechanism having several positions of adjustment; one position permitting ready disengagement of the line from the float; another position clamping the line securely to the float; and an intermediate position wherein the float is freely adjustable along the line but is restrained from separation therefrom.

An important object of the invention is to provide a bobber of the type disclosed with parts so interrelated as to facilitate manufacture of the bobber. In this connection the bobber comprises mating half sections with axial cores, one of the cores being hollowed to provide an internal cavity to receive a spring biased reciprocable and rotatable clamp plate preferably in the form of a tubular cap. The core is further axially bored to receive the shank of a relatively stationary hook which extends through the cap for line clamping cooperation therewith, the shank being provided with an offset portion seating in the core to restrain the hook from reciprocation or rotation. In this structure the spring is wholly concealed within the body of the float, and the cap is supported by the spring and is biased toward line clamping engagement with the hook to be retracted by finger pressure. The entire bobber is readily assembled, the parts coming into operative relation upon the uniting of the mating half sections.

A further object of the invention is to provide a bobber having relatively rotatable hook and clamp plate elements between which the line is engaged, and means for positively adjusting the respective elements to line engaging position or intermediate position whereby the bobber may slip freely along the line.

Other objects and advantages will be more apparent to one skilled in the art upon an examination of the following disclosure.

Figure 1:
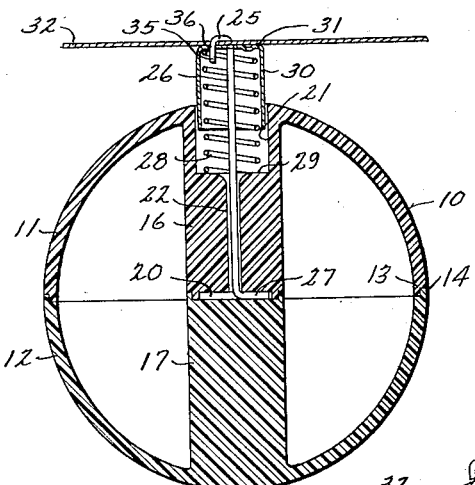
Fig. 1 is an axial cross section through a bobber embodying the invention showing the clamp cap in position to clamp the line securely against the clamp hook.

The bobber comprises a buoyant float indicated generally as 10. In the preferred embodiment the float comprises mating hollow hemispherical half sections 11 and 12, which may be of synthetic plastic or the like, and which are respectively provided with interengaging peripheral lap joints 13 and 14 which interengage to seal the parts in watertight relation. The joint may be cemented to insure adhesion. Each hemisphere is further provided with an axial core 16 and 17 which axially align upon mating the half sections. The respective cores are likewise provided with interengaging lap joints 18 and 19 which may be cemented to complete the assembly of the float. The inner end of core 16 is provided with a shallow diametric lateral bore in the form of a slot 20 for a purpose to be hereinafter described more in detail.

The core 16 of half section 11 is provided with an axial socket or cavity 21 which opens to the outer periphery of the float and which is further provided with an axial bore 22 of reduced cross section which leads from the base 29 of socket 21 to the lateral slot 20.

A line engaging clamp or hook 25 is securely mounted in the float body and is disposed centrally above the socket 21 upon its shank 26 which passes through the core bore 22. The shank 26 has an offset portion 27 which extends laterally into the core slot 20 to secure the clamp against reciprocation and rotation, and which further acts against the bias of spring 29 to maintain the adjustable parts in selected relative position as hereinafter described.

A compression spring 28 encircles clamp shank 26 and is largely internally housed within socket 21. Spring 28 is seated against the base 29 of the socket and yieldably biases a hollow tubular cap 30 toward the clamp 25. The top 31 of the cap provides a clamp plate or seat cooperative with the clamp 25 to frictionally bind a fish line 32 therebetween. The clamp plate 31 is centrally apertured at 37 to receive the shank 26 of the clamp and serves to guide the cap on the shank in the course of its reciprocation.

Figure 3:
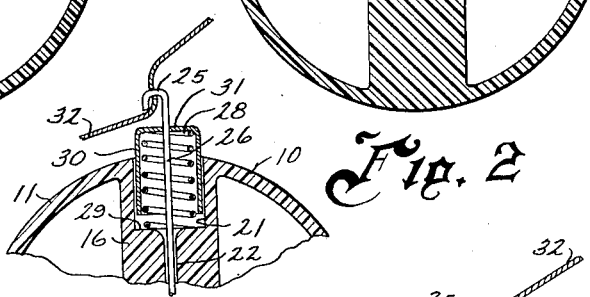
Fig. 3 is a fragmentary cross sectional view through the bobber showing the adjustable seat or cap in a depressed position exposing the free end of the clamp hook so as to permit the bobber to be disengaged completely from the line.
Figure 4:
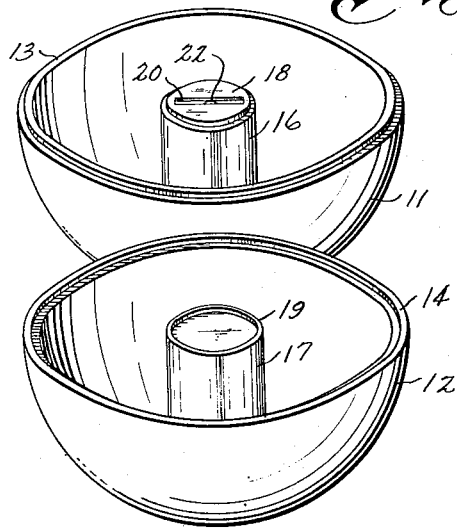
Fig. 4 is a perspective view of the respective mating parts of the bobber, said parts being separated to show their internal construction.

The tubular wall of the cap 30 is freely reciprocable in the core socket 21 and the top 31 is exposed to be manipulated by finger pressure or the like to fully retract the cap against the bias of spring 28 and from the clamp 25 as shown in Fig. 3. In this manner the prong or hooked portion 35 of the clamp is completely exposed and free of the cap top to permit manipulation of the line into or out of engagement with the clamp. Both the wall of socket 21 and the shank 26 serve to guide the cap in the course of its reciprocal movement.

Figure 2:
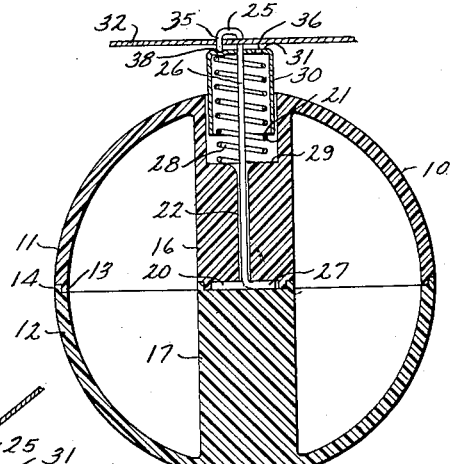
Fig. 2 is a similar axial cross section through the bobber showing the parts in an intermediate position whereby to permit the line to freely slip through the clamp hook for bobber adjustment purposes.
Figure 5:
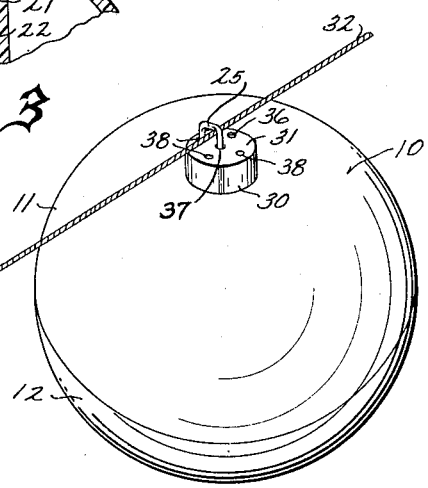
Fig. 5 is a perspective view of the bobber with its adjustable cap so positioned respecting the clamp hook as to permit relative movement between the fish line and the bobber.

In order to selectively lock the clamp plate against rotation and in its line engaging or intermediate positions respecting the clamp hook, the cap top or clamp plate 31 is provided with a through aperture 36 and with shallow depressions 38 offset in a circle pattern about the central aperture 37. As best shown in Fig. 1 the through aperture 36 receives the clamp prong 35 in one angular position of the cap to permit the clamp plate 31 to fully extend under the bias of spring 28 to bind the line between the plate and bight of the clamp 25. To shift the adjustment to intermediate position the cap 30 is retracted in its socket 21 against the bias of the spring to clear the prong 35 and is then rotated to engage the prong with one of the depressions 38 which acts as a detent to positively hold the cap 30 in intermediate position. This position is best shown in Figs. 2 and 5 and permits the bobber to be adjusted freely along the line without it being necessary to continue to use finger pressure to hold the cap away from the clamp. The bobber is nevertheless restrained from complete separation from the line as the line is slidably confined in the bight of the clamp hook.

The cap 30 freely rotates within the socket 21 upon an axle provided by the clamp shank 26, the aperture 37 forming a bearing for the shank. In either the extended or intermediate position of the cap the parts are held to the float against the bias of spring 28 by the clamp shank 26 and its offset portion 27 seated in the core 16.

As is readily understood from the foregoing description the improved fishing bobber involves a very simple construction wherein the line engaging clamp is stationary respecting the float and is spaced above a spring pressed clamp plate which is movable toward and away from the clamp. The spring is largely concealed within the float, only a portion of the cap being exposed. The clamp plate cooperates with the clamp in at least three distinct positions of adjustment; one of which permits manipulation of the line to disengage the bobber completely from the line; another of which provides for the secure binding of the line to the bobber; and an intermediate position wherein the bobber is freely movable along the line but which is restrained from separation therefrom.

I claim:

1. In a fishing bobber the combination with a float body having a socket, a line clamp mounted in the body and comprising a shank co-axial with the socket and a hook carried by the shank and spaced from the body over the socket, a tubular cap rotatable in the socket between the hook and the body and reciprocable in the socket toward and away from the hook, said cap having a top portion providing a plate having an axial opening through which the shank extends, said opening forming a bearing on which the cap is rotatable in said socket, said plate being cooperative with the hook to engage a fish line therebetween, and a compression spring within the cap and seated against the base of the socket whereby to normally bias the cap plate toward the hook.

2. In a fishing bobber, a float body having a socket, a clamp comprising a shank stationarily mounted in the body and coaxial with the socket and a hook carried by the shank and spaced from the body over the socket, a hollow cylindrical cap in the socket, said cap having a central aperture through which the shank extends, said aperture providing a bearing on which the cap is rotatable in said socket, said cap being further provided with a plurality of detent means engageable with the hook, said detent means being disposed on an arc centered upon said central opening, said cap being freely rotatable on said shank to dispose one or another of said detent means for engagement with said hook, and a compression spring within said cap and seated against the base of the socket whereby to bias the cap toward the hook as guided in said socket and by the shank.

3. The device of claim 2 wherein the clamp shank is provided with an offset portion, said body being provided with an offset socket within said body and into which said portion extends whereby to restrain said hook from rotation.

4. The device of claim 3 wherein the float body comprises mating half sections, one of said half sections being provided with an internally hollowed core in which the offset socket is formed, and an axial bore in the core to receive the clamp shank, said bore being in communication with said offset socket.

5. A fishing bobber comprising mating hemispheres having diametric cores which mate within the bobber, one of said cores having a socket opening to the periphery of the bobber, an axial bore communicating with the socket and a lateral bore communicating with the axial bore, said lateral bore comprising a shallow slot on the inner end of one of said cores.

6. In a fishing bobber, a float body comprising mating hemispheres having diametric cores mating within the body, one of said cores having a socket opening to the periphery of the bobber, and a bore extending from said socket to the inner end of said core, one of said cores being provided with a shallow slot on its inner end which communicates with said bore, and a clamp hook having a prong disposed over the socket and a shank in said bore, said shank having an offset portion seated in said shallow slot.

FRANK D. MATRAS.

References Cited in the file of this patent

UNITED STATES PATENTS

| Number | Name | Date |
|---|---|---|
| 514,034 | Redfield | Feb. 6, 1894 |
| 978,519 | Vaughn | Dec. 13, 1910 |
| 1,371,170 | Johnson | Mar. 8, 1921 |
| 1,463,020 | Olson | July 24, 1923 |
| 2,302,549 | Hodges | Nov. 17, 1942 |
| 2,415,692 | Huston | Feb. 11, 1947 |
| 2,482,343 | Ingleton | Sept. 20, 1949 |
| 2,501,471 | Larson | Mar. 21, 1950 |
| 2,557,776 | Anderson | June 19, 1951 |